(12) United States Patent
van der Poel

(10) Patent No.: US 8,485,135 B2
(45) Date of Patent: Jul. 16, 2013

(54) LIVESTOCK BRUSHING DEVICES

(75) Inventor: Johannes Godefridus Gerardus van der Poel, Roelofarendsveen (NL)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 12/349,991

(22) Filed: Jan. 7, 2009

(65) Prior Publication Data
US 2009/0114165 A1 May 7, 2009

Related U.S. Application Data

(62) Division of application No. 10/506,781, filed as application No. PCT/NL03/00199 on Mar. 18, 2003, now Pat. No. 7,481,184.

(30) Foreign Application Priority Data

Mar. 26, 2002 (NL) ..................................... 1020252

(51) Int. Cl.
*A01K 13/00* (2006.01)
*A01K 29/00* (2006.01)

(52) U.S. Cl.
USPC ............................ 119/609; 119/621; 119/664

(58) Field of Classification Search
USPC ................. 119/621, 609, 612, 615, 664, 663, 119/652; 15/53.3, 53.1, 53.2, 97.3
See application file for complete search history.

(56) References Cited

U.S. PATENT DOCUMENTS

| | | | |
|---|---|---|---|
| 3,599,606 A | | 8/1971 | Hayward |
| 3,761,986 A | * | 10/1973 | Rickel .............................. 15/53.3 |
| 3,793,667 A | | 2/1974 | Capra |
| 3,942,207 A | | 3/1976 | Weigle et al. |
| 4,014,294 A | | 3/1977 | Hovorak |
| 4,354,291 A | | 10/1982 | Ennis |
| 4,513,467 A | | 4/1985 | Roncaglione |
| 4,614,449 A | | 9/1986 | Korfgen et al. |
| 4,754,515 A | * | 7/1988 | Ennis et al. ..................... 15/53.3 |
| 4,995,344 A | | 2/1991 | Olson |
| 5,361,443 A | | 11/1994 | Belanger et al. |
| 3,175,537 A | | 3/1995 | Paul |

(Continued)

FOREIGN PATENT DOCUMENTS

| | | |
|---|---|---|
| DE | 100 02 688 A | 5/2001 |
| EP | 0 287 176 | 10/1988 |

(Continued)

OTHER PUBLICATIONS

C.C.A.G. Crotti Catalog, "Spazzole Teniche Industriall E Trasformazione Polimari".
C.C.A.G. Crotti Catalog, "Premiato Spazzolificio".

*Primary Examiner* — Monica Williams
(74) *Attorney, Agent, or Firm* — Young & Thompson

(57) ABSTRACT

A brushing device for brushing livestock has an oblong brush (2) that can be set in motion by a motor (6). A carrying means for carrying the brush comprises at least one flexible element (10a, 10b). In the absence of a force acting externally upon the brush (2), the brush (2) has a substantially vertical orientation. The at least one flexible element (10a, 10b) of the carrying means permits a swivelling of the brush (2), through a force acting externally upon it, to a substantially horizontal orientation of the brush (2). The at least one flexible element (10a, 10b) is oblong and tubular.

6 Claims, 2 Drawing Sheets

| U.S. PATENT DOCUMENTS | | | | FOREIGN PATENT DOCUMENTS | | |
|---|---|---|---|---|---|---|
| 5,540,186 A | 7/1996 | Udelle | | EP | 0 895 715 A1 | 2/1999 |
| 5,709,002 A | 1/1998 | Belanger et al. | | EP | 1 145 630 A | 10/2001 |
| 5,715,558 A | 2/1998 | Johnson | | GB | 2 132 884 A | 7/1984 |
| 5,979,002 A | 11/1999 | Anderson | | JP | 11-243802 | 9/1999 |
| 6,202,244 B1 * | 3/2001 | Anderson | 15/53.2 | | | |
| 6,318,298 B1 | 11/2001 | Nonay | | | | |

* cited by examiner

LIVESTOCK BRUSHING DEVICES

This application is a Divisional of Application Ser. No. 10/506,781, filed on Mar. 25, 2005 now U.S. Pat. No. 7,481,184, which was filed as PCT/NL03/00199 on Mar. 18, 2003 and for which priority is claimed under 35 U.S.C. § 120. This application also claims priority of Application No. 1020252 filed in the Netherlands on Mar. 26, 2002 under 35 U.S.C. § 119. The entire contents of all of the above applications are hereby incorporated by reference.

BACKGROUND OF THE INVENTION

The present invention relates to a brushing device for brushing livestock, having an oblong brush that can be set in motion by a driving means, and having a carrying means for carrying the brush, the carrying means comprising at least one flexible element. The brushing device is suitable in particular for brushing large animals such as cows, horses, pigs, goats and the like, but is not limited to these animals. Such livestock brushing devices are known.

U.S. Pat. No. 6,318,298 discloses a brushing device that has a horizontally disposed cylindrical brush for cows that can rotate about its longitudinal axis. One shaft of the brush is mounted on one end of the brush, on one end of an arm that can pivot in a vertical plane, so that the height of the brush can vary. The initial position of the brush is the lowest possible position. The pivot of the arm is fixed to a wall or a column. The rotation of the brush, which is obtained by driving the brush shaft by a motor by way of a chain transmission in the pivoting arm, is activated automatically by contact, the height of the brush being determined by the force that the cow exerts upon the brush. Channels may be provided in the shaft of the brush, by means of which channels a treatment agent can be introduced into the brush, in order to transfer said treatment agent to the skin and hair of the cow. The horizontal brush can reach only the back and high-up horizontal surfaces of the cow.

Japanese Patent Application No. 11-243802 discloses a brushing device with an assembly of a horizontally disposed, cylindrical brush that can rotate about its longitudinal axis and a similar vertically disposed brush for cows or horses. Both brushes have a central driving shaft that is mounted in a frame, which can be fixed to a wall or column. The shaft of the horizontal brush is mounted on one end of the brush, while the shaft of the vertical brush is mounted on both ends of the brush. A motor accommodated in the frame drives the two brush shafts by way of bevel gear transmissions. The position of the brushes is substantially fixed relative to the frame, although the horizontal brush is connected to the driving shaft at its driven end by means of a spring element, with the result that a limited swivelling of the horizontal brush is possible if the animal exerts a transverse force upon it. The horizontal brush can reach the higher-up horizontal surfaces of the animal, while the vertical brush can also reach the lower-down vertical surfaces of the animal.

A disadvantage of the known brushing devices is that a complex and consequently relatively expensive mechanical construction is necessary to provide the envisaged functionality: the height variation of the horizontal brush according to U.S. Pat. No. 6,318,298 and the large surface of the animal that can be reached according to Japanese Patent Application No. 11-243802.

The object of the invention is substantially to overcome at least one of the abovementioned disadvantages, and to that end the invention provides a brushing device of the abovementioned type, which is of a simple design and is consequently relatively cheap, and is capable of reaching a large surface, and is characterized in that in the absence of a force acting externally upon it, the brush has a substantially vertical orientation, and in that the at least one flexible element of the carrying means, through a force acting externally upon it, permits a swivelling of the brush to a substantially horizontal orientation of said brush. In this way a large surface of the animal can be reached with a single brush: the back and higher-up surfaces when the brush has substantially a horizontal orientation, and the sides and lower-down surfaces when the brush has substantially a vertical orientation.

In a simple preferred embodiment, the at least one flexible element is oblong, and more particularly is substantially tubular. Such a flexible element is, on the one hand, flexible in the transverse direction and, on the other hand, torsionally rigid, and can also be of a spring-loaded design. If spring force is particularly desired, the at least one flexible element is preferably a leaf spring or a coil spring in which the spring force is used for driving the brush back to the vertical orientation when the brush is not situated in a vertical orientation.

In a preferred embodiment, the driving means is rigidly connected to the brush, which means that the carrying means carries both the driving means and the brush in a swivelling manner.

In another preferred embodiment, the driving means is connected to the brush by way of a flexible connection, so that only the brush is carried by the carrying means and can swivel, and the driving means is disposed in a non-swivelling manner and drives the brush by way of the flexible connection.

The driving means is preferably designed for rotating the brush about its longitudinal axis, in order to obtain a simple driving of the brush.

In another preferred embodiment, the driving means is designed for moving the brush substantially in a plane parallel to the longitudinal axis of the brush, in order to obtain a back and forth and/or circular movement of the brush hairs substantially in the plane of the free brush hair ends.

The brushing device is also preferably provided with a means for drip-feeding a treatment agent from a place situated above the brush onto the brush. In particular, where there is simultaneous use of a carrying means with hollow tubular elements, the treatment agent can be guided through the elements to the brush.

The invention is explained in greater detail below with reference to the drawing, which shows a number of embodiments that are given only by way of non-limiting examples, and in which:

DESCRIPTION OF THE DRAWINGS

In the different figures identical parts or parts with a similar function are indicated by identical reference numerals.

FIG. 1 shows an oblong, substantially cylindrical brush 2 with a diameter of, for example, 0.5 metre, and with brush hairs projecting substantially radially from the (longitudinal) shaft 4 of the brush 2.

Figure 1:
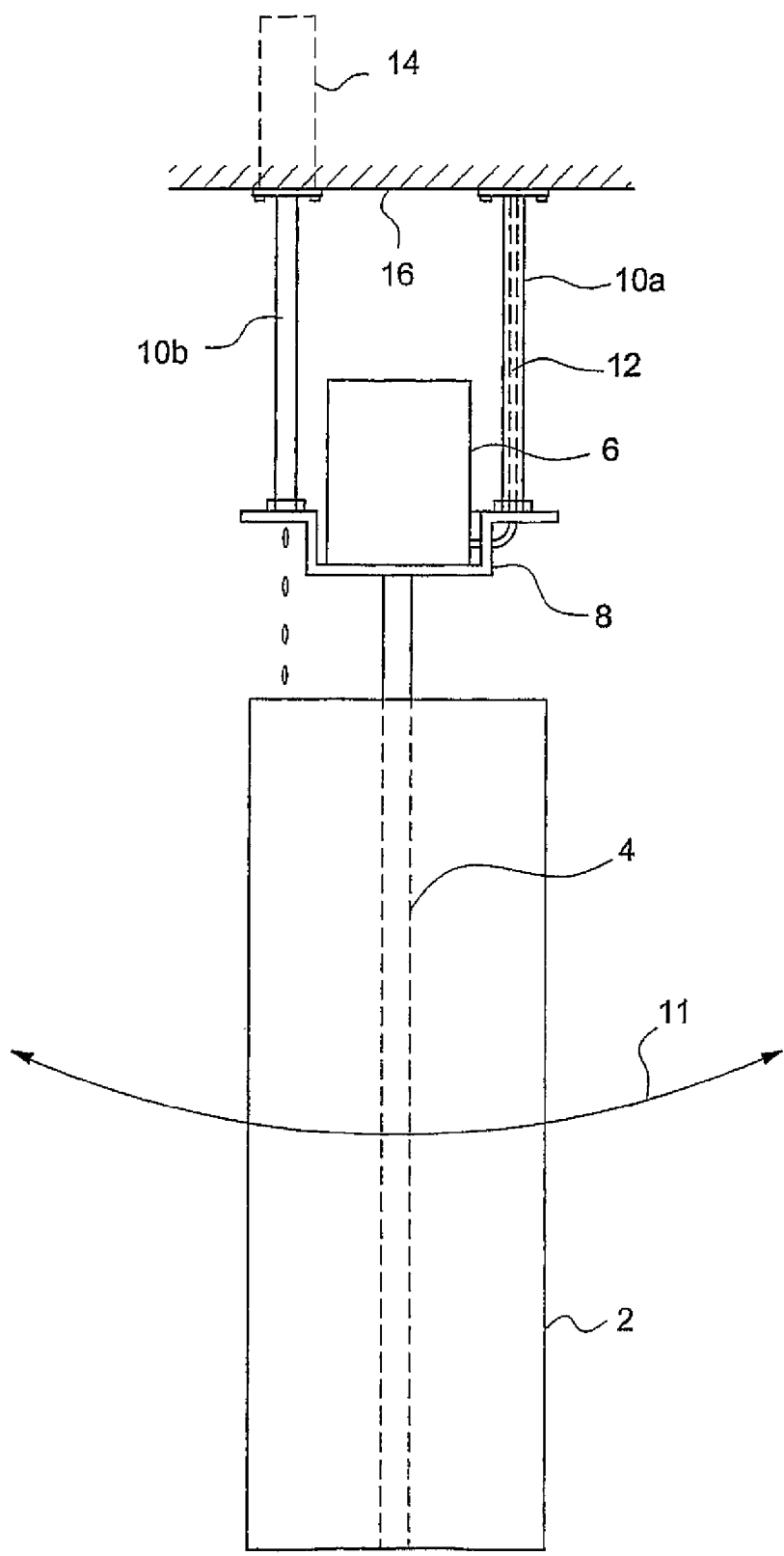
FIG. 1 shows diagrammatically a side view of a brushing device according to the invention in a first embodiment.

The shaft 4 of the brush 2 is driven at its one end by a motor 6, which has a rotor that directly drives the shaft 4, or comprises a reductor, for adjusting the desired speed of revolution of the brush (for example, 20 revolutions per minute) to the available speed of rotation of the rotor of the motor 6 (for example, 1,500 revolutions per minute).

The motor 6 is connected to a rigid frame 8, which in turn is fixed to two flexible, possibly spring-loaded, oblong elements 10a, 10b, for example in the form of flexible hollow hoses of the type that are used in hydraulics. The flexible elements 10a, 10b permit a swivelling of the motor 6 from the illustrated vertical orientation to a horizontal orientation in any desired direction, as indicated by double arrows 11. In this case, in the configuration shown a swivelling in a direction perpendicular to a plane through the elements 10a, 10b will require less force than a swivelling in the plane through the elements 10a, 10b.

If element 10a is of a hollow design, one or more supply lines 12 may be guided internally through this element 10a, in order to supply energy to the motor 6. The type of supply line(s) is, of course, dependent upon the type of motor, which is preferably of the electrical type, but can also be of the hydraulic or pneumatic type. The switching on and off of the motor 6 can be performed in a known manner, which is simple for the person skilled in the art to implement, by contact and period of time after switching on respectively.

If element 10b is of a hollow design, a treatment agent, for example against mange or against flies, can be conveyed in a drip feed from reservoir 14 to the area above the brush 2. The treatment agent falls, for example in drops, onto the hairs of the brush 2, and will be distributed over them when the brush 2 is used.

The number of elements may be selected in a number other than two: it may be equal to one and also greater than two In the event of only one element being used, said element will be fitted in line with the brush shaft 4, although this is not essential. In this way it can be ensured that the swivelling of the brush from the vertical orientation requires substantially the same amount of force in all directions (one element or many symmetrically placed elements), or that, as has already been indicated above, the swivelling requires more force in some directions than in others.

The design of the elements may be selected within broad limits, so long as the practical requirements of flexibility, (torsional) rigidity and spring force are met. Possible elements are rubber or plastic bars, hollow or otherwise, possibly a laminated structure, leaf springs or coil springs, combinations of the abovementioned components or the like It is also conceivable to use flexible elements without—or with a very slight—spring force and/or rigidity, such as one or more universal couplings, chains, belts or cables, for suspension of the brush 2, possibly in combination with provisions for damping the movements of the brush 2 when in operation, when the orientation of the brush 2 changes through the exertion of forces upon it by the animals. In this case gravity ensures that the brush 2 always seeks the vertical orientation.

The brushing device is, for example, suspended from a ceiling 16 of an outhouse at a position that is readily accessible for the animals. For example, the animals have the opportunity to make use of the brushing device on their own initiative. Instead of an attachment to a ceiling 16, it is also possible to choose a wall attachment to a carrying frame projecting transversely to the wall, or a floor attachment to an inverted T-shaped carrying frame or the like. What is important is the vertical orientation of the brush 2 in an initial position of said brush when no external forces are being exerted upon the brush 2.

When the brushing device is being used, the motor 6 for rotation of the brush 2 starts, preferably after the animals have been in contact with the brush 2, and the rotation continues for a predetermined period of time after the contact, or the last contact. Provision can be made for a controlled valve (not shown in any further detail) for starting the supply of treatment agent from the reservoir 14 only when the motor 6 is being started up, and for stopping it in synchronization with the stopping of the rotation of the motor.

By exerting a force upon the brush 2, the animal can change the orientation of the brush 2 between a substantially vertical orientation and a substantially horizontal orientation, so that a large part of the surface of the animal can be reached by the brush.

Figure 2:
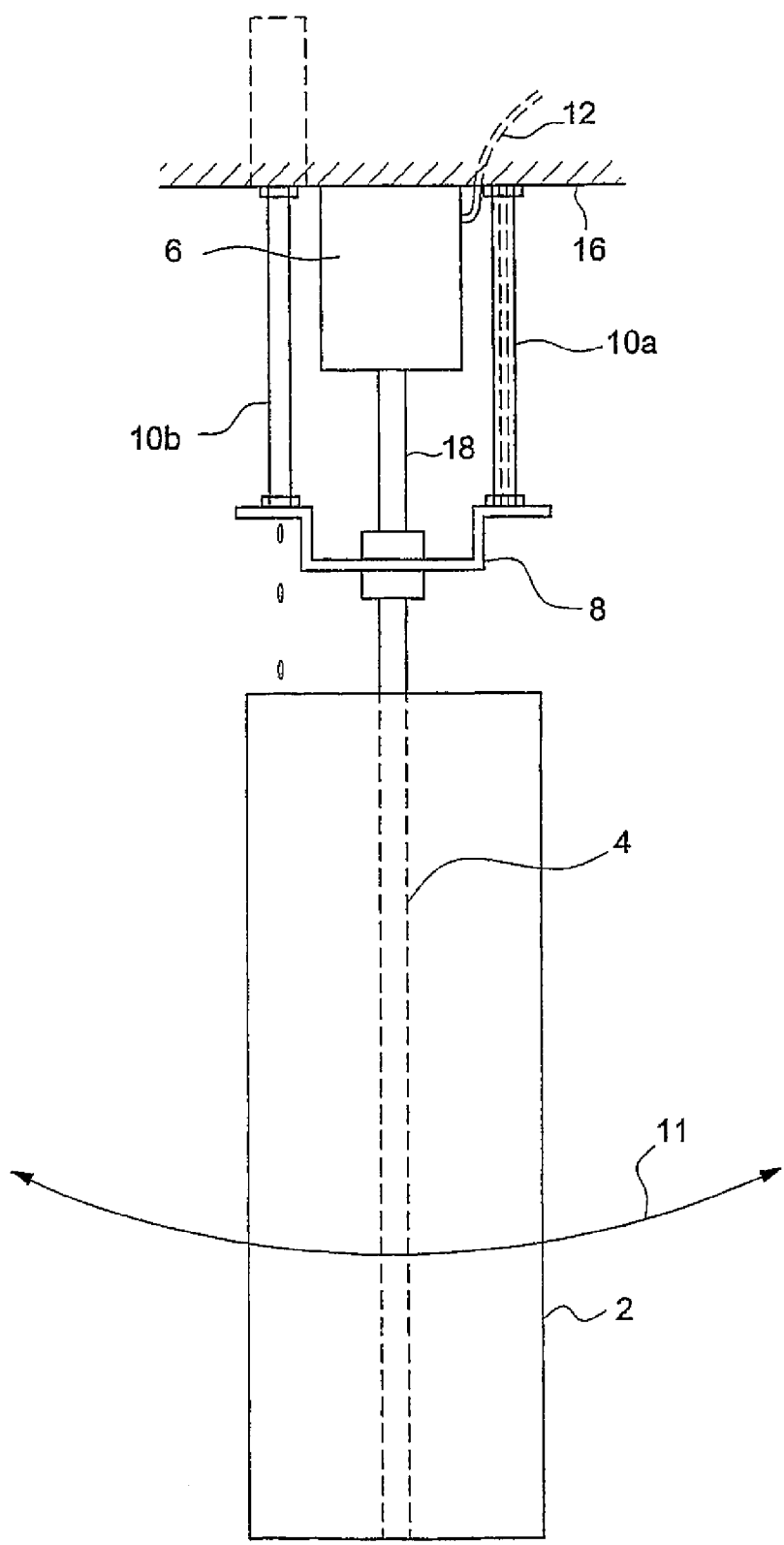
FIG. 2 shows diagrammatically a side view of a brushing device according to the invention in a second embodiment.

FIG. 2 shows an embodiment of the brushing device in which the motor 6a is connected to the brush 2 by way of a flexible connection 18, and is set up in a fixed manner. The connection 18 must have the necessary (torsional) rigidity, in order to permit driving of the brush, and can be designed in the same ways as or in a different way from the elements 10a, 10b discussed above. Otherwise, the brushing device shown in FIG. 2 has the same components as those discussed above with reference to FIG. 1.

In the above the rotating brush 2 is shown as a substantially cylindrical unit. However, it is also possible within the scope of the invention to vary the diameter of the brush, viewed in its lengthwise direction, in order to form, for example, a convex or concave profile, or a ridged profile.

In an embodiment of the brushing device in which the brush carries out substantially a movement in a plane (parallel to the longitudinal axis of the brush), such as a circular or a back and forth movement or a combination of the two, the brush can be of a flat design on at least one side face, or may comprise a curved face in the longitudinal direction of the brush. In that case the motor may be rotating or vibrating and, possibly through a suitable transmission, provide for the desired movement of the brush.

The invention claimed is:

1. A livestock brushing device for brushing livestock, comprising:
    a driving mechanism;
    a carrier that supports the livestock brush, the carrier including at least one flexible element,
    wherein the driving mechanism is configured to provide movement of the livestock brush in a plane parallel to a longitudinal axis of the livestock brush,
    wherein in the absence of a force other than gravity acting externally upon the livestock brush, the livestock brush has a substantially vertical orientation for brushing external sides of an animal, and
    wherein said movement comprises a back and forth movement.

2. The livestock brushing device according to claim 1, wherein said driving mechanism comprises a vibrating motor.

3. The livestock brushing device according to claim 1, wherein said movement further comprises a circular movement.

4. The livestock brushing device according to claim 3, wherein said driving mechanism comprises a rotating motor.

5. The livestock brushing device according to claim 1, wherein the at least one flexible element is hollow.

6. The livestock brushing device according to claim 5, further comprising a reservoir for holding a liquid, said reservoir being in fluid communication with said at least one hollow flexible element.

* * * * *